(12) United States Patent
Jain et al.

(10) Patent No.: US 9,491,673 B2
(45) Date of Patent: Nov. 8, 2016

(54) METHOD AND APPARATUS FOR M2M DEVICE SUBSCRIPTION

(75) Inventors: Puneet Jain, Hillsboro, OR (US);
Ashok Sunder Rajan, Brunaby, CA (US)

(73) Assignee: INTEL CORPORATION, Santa Clara, CA (US)

(*) Notice: Subject to any disclaimer, the term of this patent is extended or adjusted under 35 U.S.C. 154(b) by 1 day.

(21) Appl. No.: 13/977,124

(22) PCT Filed: Dec. 21, 2011

(86) PCT No.: PCT/US2011/066572
§ 371 (c)(1),
(2), (4) Date: Jun. 28, 2013

(87) PCT Pub. No.: WO2013/019264
PCT Pub. Date: Feb. 7, 2013

(65) Prior Publication Data
US 2013/0272252 A1    Oct. 17, 2013

Related U.S. Application Data

(60) Provisional application No. 61/514,010, filed on Aug. 1, 2011.

(51) Int. Cl.
*H04W 72/00* (2009.01)
*H04W 36/08* (2009.01)
(Continued)

(52) U.S. Cl.
CPC ............. *H04W 36/08* (2013.01); *H04W 4/001* (2013.01); *H04W 12/06* (2013.01); *H04W 36/14* (2013.01);
(Continued)

(58) Field of Classification Search
CPC . H04W 4/005; H04W 4/008; H04W 72/048; H04W 84/18; H04W 60/00; H04W 68/00; H04W 76/00; G01D 5/00; H04L 67/12
USPC ............. 370/252, 270, 277–278, 282, 310.2, 370/328–331, 338–339, 349, 432, 437; 455/414.1, 420, 423.2, 434, 436–439, 455/444, 450–451, 452.1, 464, 13.3, 411, 455/435.1; 726/2, 6
See application file for complete search history.

(56) References Cited

U.S. PATENT DOCUMENTS 7,349,710 B2 *  3/2008  Kaplan et al. ............... 455/466
2005/0176438 A1 *  8/2005  Li ......................... H04W 12/08
455/450

(Continued)

FOREIGN PATENT DOCUMENTS

WO   2009092115 A3   7/2009

OTHER PUBLICATIONS

International Search Report and Written Opinion, Mailed Date: Sep. 21, 2012, Application No. PCT/US2011/066572, filed Dec. 21, 2011, pp. 11.

(Continued)

*Primary Examiner* — Mohamed Kamara

(57) ABSTRACT

An apparatus may include a processor circuit and a machine type communication (MTC) device setup module operable on the processor circuit to determine when the apparatus is provisioned with a subscription to a local network, and to provide a device setup interface to automatically connect the apparatus to a machine type communication (MTC) subscriber independently of an operator of the local network. Other embodiments are disclosed and claimed.

25 Claims, 13 Drawing Sheets

(51) Int. Cl.
- *H04W 12/06* (2009.01)
- *H04W 72/02* (2009.01)
- *H04W 52/02* (2009.01)
- *H04W 36/14* (2009.01)
- *H04W 4/00* (2009.01)
- *H04W 76/04* (2009.01)
- *H04W 36/00* (2009.01)

(52) U.S. Cl.
CPC ......... *H04W 52/0225* (2013.01); *H04W 72/02* (2013.01); *H04W 4/005* (2013.01); *H04W 36/0038* (2013.01); *H04W 76/046* (2013.01); *Y02B 60/50* (2013.01)

(56) References Cited

U.S. PATENT DOCUMENTS

| | | | |
|---|---|---|---|
| 2006/0195517 A1 | 8/2006 | Kaplan et al. | |
| 2007/0157022 A1 | 7/2007 | Blom et al. | |
| 2009/0215447 A1* | 8/2009 | Catalano | H04W 48/18 455/432.1 |
| 2009/0217348 A1* | 8/2009 | Salmela | H04L 63/08 726/2 |
| 2010/0057485 A1* | 3/2010 | Luft | H04W 4/00 455/411 |
| 2010/0304716 A1* | 12/2010 | Hoeksel | H04W 4/005 455/411 |
| 2010/0318798 A1 | 12/2010 | Binding et al. | |
| 2011/0128911 A1 | 6/2011 | Shaheen | |
| 2011/0201307 A1* | 8/2011 | Segura | H04W 48/02 455/411 |
| 2011/0235558 A1* | 9/2011 | Diachina | H04W 48/02 370/310 |
| 2011/0268047 A1* | 11/2011 | Nath | H04W 4/005 370/329 |
| 2011/0299492 A1* | 12/2011 | Lee | H04W 4/00 370/329 |
| 2012/0252445 A1 | 10/2012 | Lindholm et al. | |

OTHER PUBLICATIONS

Office Action received for Japanese Patent Application No. 2014-523910, mailed Mar. 3, 2015, 7 pages including 3 pages English translation.

Office Action received for Korean Patent Application No. 2014-7004819, mailed Mar. 26, 2015, 11 pages including 5 pages English translation.

Extended European Search Report received for European Patent Application No. 11870295.0, mailed Jun. 8, 2015, 5 pages.

Decision to Grant received for Russian Patent Application No. 2014107669, mailed Oct. 30, 3015, 8 pages (untranslated).

Decision to Grant received for Korean Patent Application No. 2014-7004819, mailed Oct. 30, 3015, 3 pages (untranslated).

* cited by examiner

METHOD AND APPARATUS FOR M2M DEVICE SUBSCRIPTION

This application claims priority to U.S. provisional patent application No. 61/514,010 Aug. 1, 2011 and incorporated by reference herein in its entirety.

BACKGROUND

Machine to Machine (M2M) communications, also termed "machine type communications" (MTC), is emerging as a dynamic technology, which enables the "Internet of things" that can exchange information without human interaction. In some cases MTC communication entails wireless information exchange between a subscriber station (MTC device) and a server in the core network of an operator, with the aid of a base station in the radio access network of the operator. Another example involves the wireless exchange of information between two different subscriber stations linked to a base station. In each of these MTC communications, no human interaction need take place.

MTC devices also typically differ from traditional mobile station (MS) (also termed User Equipment (UE) devices) that require human-to-human communication in that groups of MTC devices may have a larger geographic spread of devices that are attached to a single subscription. In one example, smart metering devices attached to a utility company that constitutes an MTC Subscriber can be operationally dispersed nationwide or even internationally. This geographical dispersion differs from conventional arrangements for human-operated devices in which multiple UEs associated with a mobile subscriber may be operational proximate a subscriber's location, which may be geographically limited. Hence operational locations of MTC devices may be independent of the MTC subscriber location, which is generally very different from UEs, which typically operate in the same area as a given subscriber.

The need for MTC devices to potentially operate at locations remote to a geographic location of the MTC subscriber places special requirements on the network architecture for deploying MTC devices. For example, an MTC device that is not deployed proximate the location of the MTC subscriber for the MTC device may require a different home public land mobile network (HPLMN) than the HPLMN associated with the MTC subscriber. Providing roaming operation for MTC devices is one method to address this requirement. The MTC subscriber thus may have to ensure that a roaming arrangement is available at the location in which a given (remote) MTC device is to operate. Given a large number of MTC devices that the MTC subscriber may employ, and a large number of different geographically dispersed locations in which the MTC devices may operate, an MTC subscriber may need to establish a large number of roaming arrangements before the time of deployment of the MTC devices at the different locations. Moreover, since the roaming arrangements are based on traffic commitment, the establishing and maintaining of such multiple MTC roaming agreements may be exceedingly complex.

It is with respect to these and other considerations that the present improvements have been needed.

DETAILED DESCRIPTION

Various embodiments are related to improving machine to machine (M2M) communications in a wireless network. In various embodiments, the M2M may communications may be carried by an operator that manages a radio access network and core network to transmit data from an M2M device. Some embodiments of a communications system may be implemented with a radio technology such as the Institute of Electrical and Electronics Engineers (IEEE) 802.16 (WiMAX), IEEE 802-20, evolved UTRA (E-UTRA), European Telecommunications Standards Institute (ETSI), etc. IEEE 802.16m and 802.16p are an evolution of IEEE 802.16e, and provide backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. LTE-advance (LTE-A) is an evolution of the 3GPP LTE.

Various embodiments are related to provisioning mobile devices, such as MTC devices with subscriptions in locations remote to a subscriber. In many scenarios, a subscriber may wish to deploy MTC devices in multiple locations that are each serviced by a different HPLMN. It may therefore be desirable for MTC devices to be distributed from a point of manufacture or storage without a subscription, since the home location of a subscriber's server and HPLMN may not correspond to the HPLMN where the subscriber's MTC devices are to be deployed. Because scalability of operations may best be served if the MTC subscriber can obtain a subscription local to the operational location of its MTC devices, the subscriber may therefore benefit if an MTC device can be provisioned with a local subscription after the location of operation for the MTC device is determined, which may in general not be known.

Figure 1:
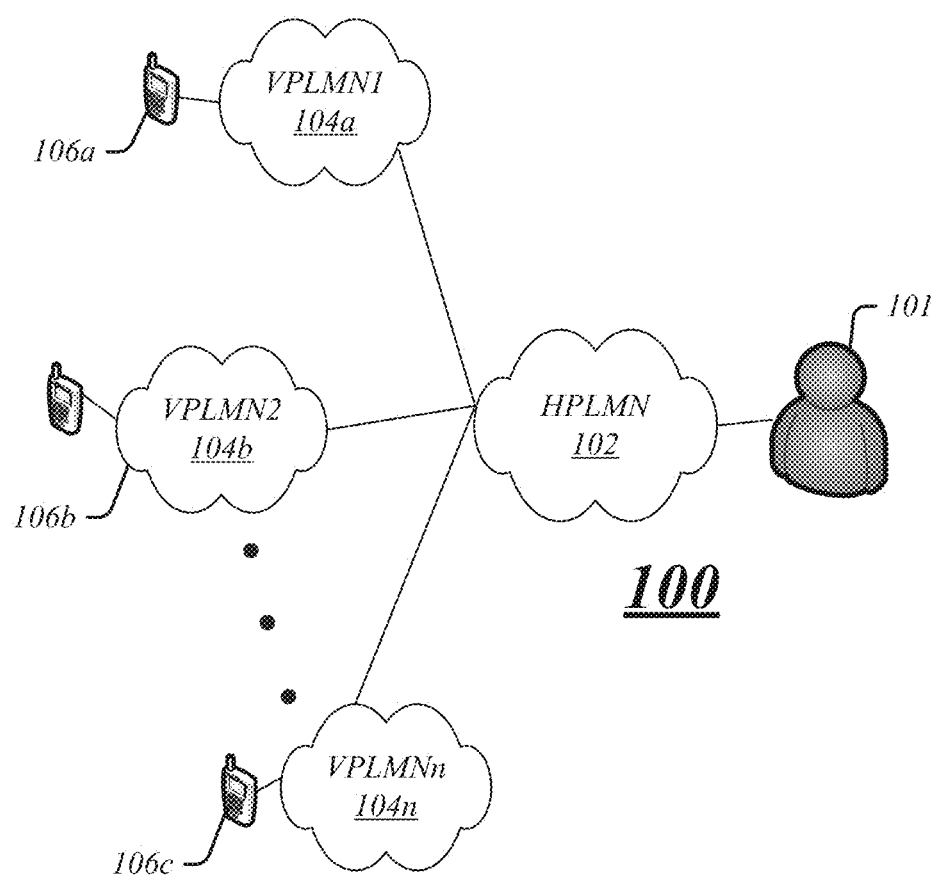
FIG. 1 depicts a conventional device subscription arrangement.

To clarify the operation of embodiments for provisioning MTC devices, FIG. 1 depicts a potential subscription arrangement 100 for UEs. The arrangement 100 illustrates a case in which a user 101 may have a subscription with a Home Public Land Mobile Network (HPLMN) 102, and in which roaming association may be provided for multiple UEs 104a-104n that are associated with respective Visitor Public Land Mobile Network (VPLMNs) 106a-106n. This arrangement may be difficult to sustain for a large number of UEs that are all potentially connected over a roaming association with the HPLMN 102. In order for such a scheme to work for a multitude of geographically dispersed UEs, the subscriber HPLMN may need to support roaming arrangements with all the different regions in which the UEs might be deployed that are economically viable to the subscriber. Another consideration for the use of arrangement 100 is that the roaming agreements need to be sustainable over time and be able to scale as a business of the subscriber grows.

In the sphere of MTC devices, the role of the user and the subscriber is separated to allow for scalability of a business model that supports a large number of geographically dispersed and remote devices. Accordingly, present day standards have been developed to distinguish the different entities involved in managing MTC devices. The 3GPP standard (see 3GPP Technical Specification TS 22.368 V11.3.0, §3.1; $3^{rd}$ Generation Partnership Project; Technical Specification Group Services and System Aspects; Service requirements for Machine-Type Communications (MTC); September 2011) defines the following entities: MTC Server—An entity that communicates to an MTC device through the PLMN; MTC User—One that uses the services of the MTC Server; and MTC Subscriber—The entity having contractual relationship with a Network (NW) operator to provide service to one-to-many MTC devices. Thus, the MTC User can be the MTC Subscriber if the MTC User has a contractual relationship with the Network Operator. In the discussion to follow, the terms "MTC subscriber" and "MTC user" are used interchangeably unless otherwise noted.

At present, however, no technical architecture exists that defines the subscription of the MTC devices to the network. In particular, there is no scheme that defines if a subscription is to be local to each HPLMN through which the device attaches to the network or remote through the VPLMN that the device would attach from. Additionally, unlike the case for UEs, the point of activation of MTC devices may not generally be known at the time of shipment. In an ideal case MTC devices could be dispatched directly from a local warehouse to the operational site. However, in practice, MTC devices may be shipped to any geographic location including those that may be remote from their point of origin. It is therefore difficult to pre-provision such devices with a subscription to a local HPLMN whose identity may not have been determined at the time the devices are manufactured and deployed to a location for shipment.

Figure 2A:
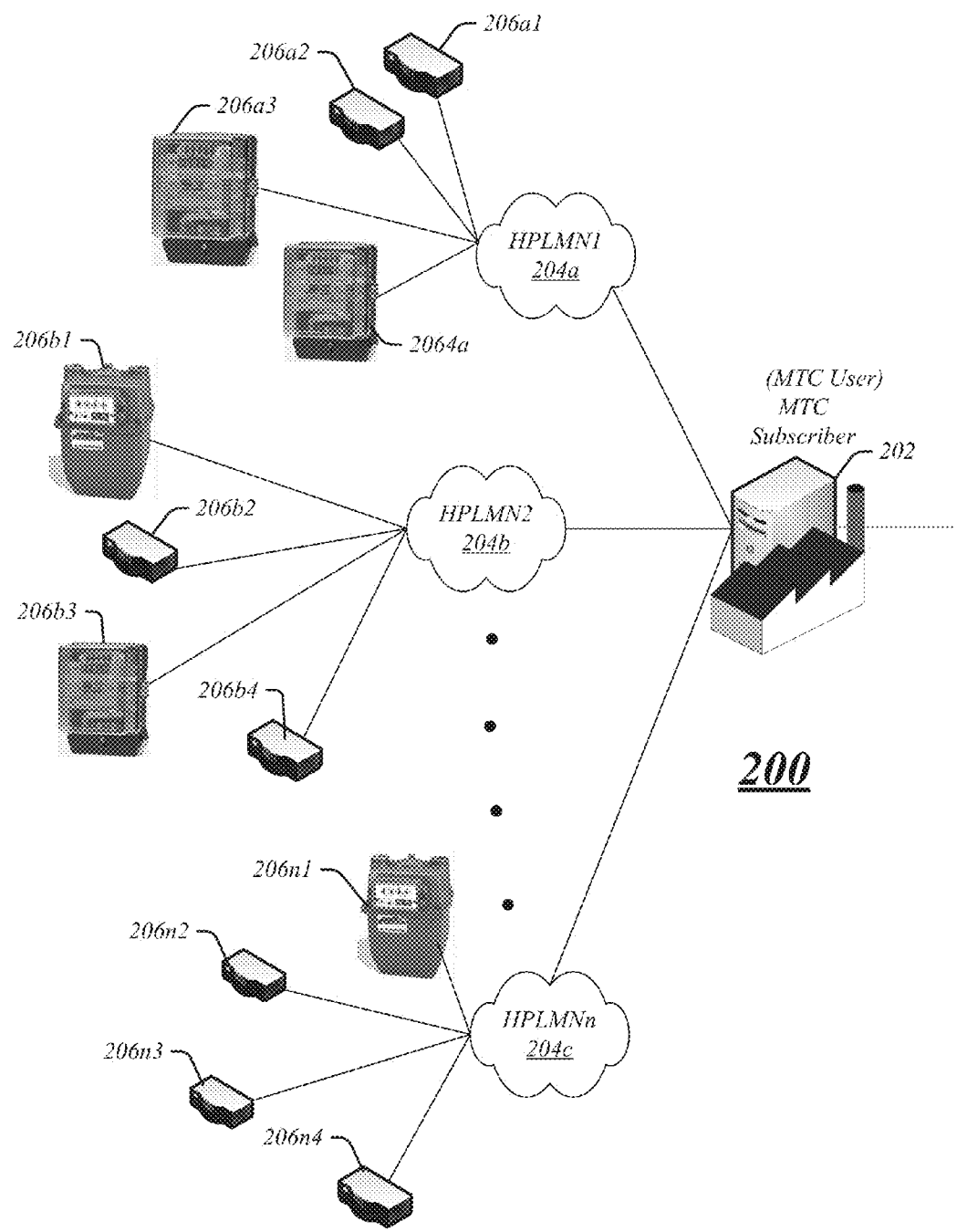
FIG. 2a depicts a subscription arrangement for MTC devices consistent with the present embodiments.

FIG. 2a depicts a subscription arrangement 200 for MTC devices consistent with the present embodiments. In the subscription arrangement 200, an MTC subscriber (user) 202 may utilize various devices (e.g., servers or UE) coupled to multiple HPLMNs 204a-204n, which may be geographically dispersed from one another and from the location of the MTC subscriber 202. In one example, the MTC subscriber 202 may be an entity that manages multiple utility devices. For example, the MTC subscriber 202 may be a utility corporation that owns or manages utilities that are dispersed over a wide geographic range, such that utility services are provided in regions serviced by different HPLMNs 204a-204n.

The MTC subscriber 202 may deploy multiple sets of MTC devices 206 in different geographic regions, which may include smart meters to measure and manage local use of utility services, such as energy services. It may therefore be convenient for the MTC subscriber 202 to establish contractual relationships with each of multiple HPLMNs 204a-204n where MTC devices managed by the MTC subscriber 202 may be located. As illustrated in FIG. a2, multiple MTC devices 206a1-206a4 may be deployed in a region of HPLMN 204a. Similarly, multiple MTC devices 206b1-206b4 may be situated in a region of HPLMN 204b. A similar arrangement of MTC devices 206 managed by MTC subscriber 202 may exist for additional HPLMNs up to HPLMN 204n. As illustrated, the MTC devices 206 may include different types of devices, which may be different types of metering devices for different entities that are all managed or owned by the MTC subscriber 202.

Consistent with the present embodiments, the MTC devices 206 may be deployed in the different respective HPLMNs 204 before being provisioned with a respective subscription to the respective HPLMNs 204, sometime referred to as a "local subscription" and "local network," respectively. This allows each MTC device 206 to be provisioned with a local subscription at the point of operation of that MTC device 206, that is, within an area serviced by an HPLMN 204 local to the MTC device 206. In this manner, each MTC device 206 can communicate with the MTC subscriber 202 without having to establish a roaming agreement with a HPLMN 204 when the MTC device 206 is deployed in a region where the HPLMN 204 is not local to the MTC subscriber 202. The subscription arrangement 200 also facilitates the ability to scale to systems where a large number of MTC devices 206 are dispersed across a large number of operator networks (HPLMNs 204).

In order to provision a local subscription to the MTC devices 206 in HPLMNs 204 that are not local to the MTC subscriber 202, in various embodiments, the MTC subscriber 202 may provide a mechanism to identify and authenticate an MTC device 206 to the MTC subscriber 202 when initially deployed in the field using the radio network of the HPLMN 204 even though the MTC device 206 does not currently have a local subscription with the HPLMN 204. After authentication, the MTC subscriber 202 may establish a connection to an authenticated MTC device 206 outside of the local HPLMN 204 (e.g., without a local subscription) to actually provision the MTC device 206 with a local subscription to the HPLMN 204. Subsequently, when the authenticated MTC device 206 is provisioned with a local subscription, the HPLMN 204 local to the authenticated MTC device 206 may function as the HPLMN 204 for that MTC device 206.

In accordance with various embodiments, device identification can entail a device ID (such as a media access control (MAC) ID or International Mobile Equipment Identity (IMEI)) provided within the MTC device 206 at the time of manufacture. In addition, authentication to an MTC device 206 may be performed via a certificate or shared secret installed in the MTC device 206 during manufacture.

Figure 2B:
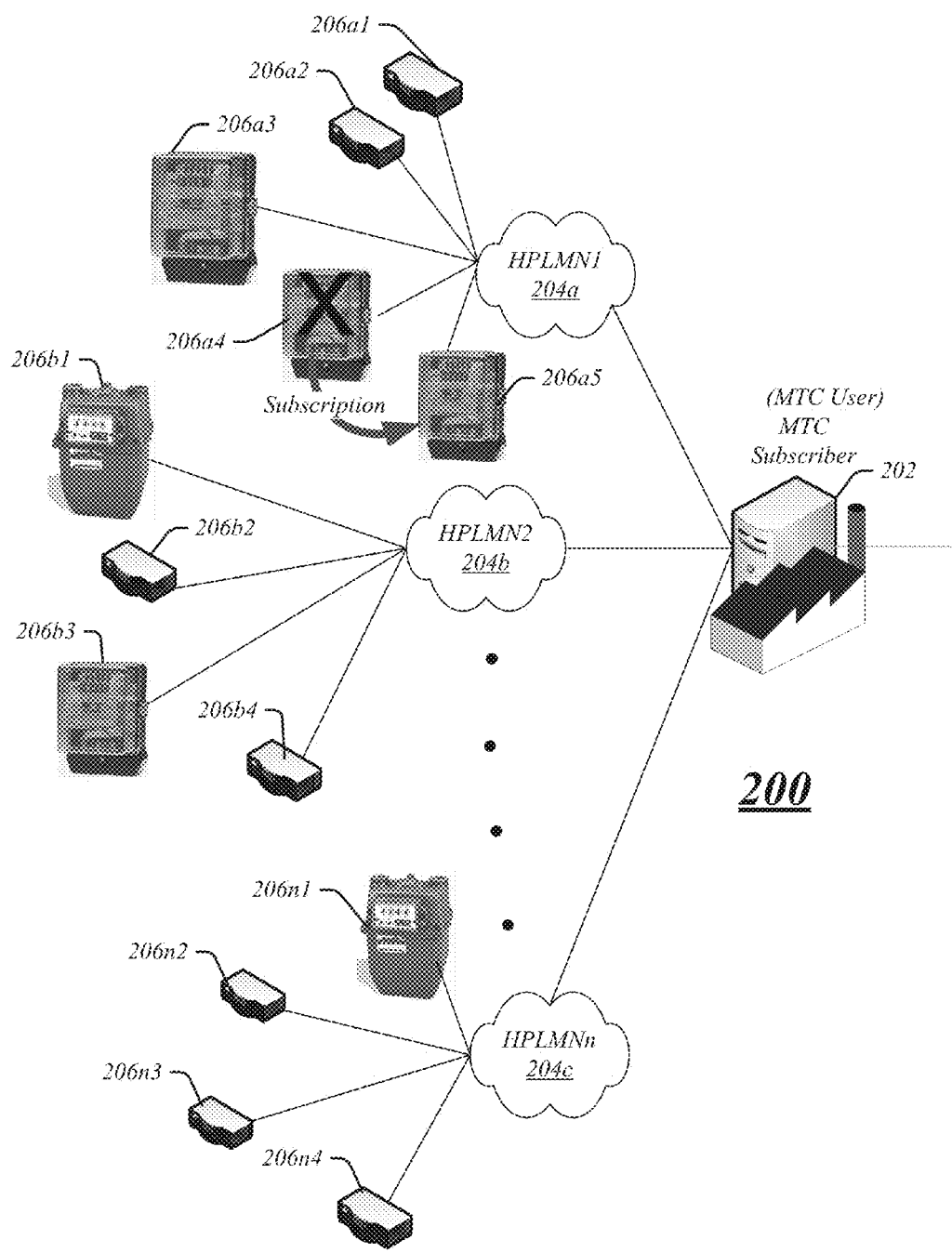
FIG. 2b depicts one scenario applicable to the arrangement for MTC devices of FIG. 2a, in accordance with some embodiments.

Once authenticated and provisioned with a subscription to an HPLMN 204, each MTC device may communicate with the MTC subscriber 202 via its respective HPMN 204. Thus, for example, a provisioned MTC device 206a3 may communicate during its operational lifetime via its local HPLMN1 204a with the MTC subscriber 202. As provided for in additional embodiments, subscriptions for MTC devices 206 thus deployed in the field may also be managed through the life-cycle of an MTC device 206. For example, during the course of operation, an MTC device 206 may become defective and need replacing. In other instances, the MTC subscriber 202 may decide to terminate services to the region provided by an MTC device 206. For example, the MTC subscriber 202 may terminate smart metering services in HPLMN2 204b that are provided by MTC devices 206b2 and 206b4. In cases where an MTC device 206 becomes defective during operation, the present embodiments provide for reprovisioning the subscription held by the defective MTC device 206. Thus, as illustrated in FIG. 2b, when an MTC device 206a4 becomes defective while deployed in the field and coupled to the HPLMN1 204a, the MTC device 206a4 may be taken out of operation. In addition, the subscription originally provisioned to MTC device 206a4 may be reprovisioned to a new MTC device 206a5, which may involve identification of MTC device 206a5 to MTC subscriber 202 and authentication, as described above. Subsequently, MTC device 206a5 may perform the function of the decommissioned MTC device 206a4, and may operate with HPMN1 204a as its home network without MTC subscriber 202 having to add or subtract a subscription.

Consistent with further embodiments, in cases in which one or more MTC devices 206 are to be taken out of operation in an HPLMN 204 because their service is no longer to be provided, their original subscriptions may be inactivated. In addition, if the MTC devices are to be redeployed for operation elsewhere, the MTC devices 206 may be provisioned with new subscriptions to a new HPLMN. Thus, MTC devices arranged according to the present embodiments may be conveniently deployed and redeployed between different geographic locations, while subscriptions to an HPLMN may be independently ported between MTC devices.

Figure 3:
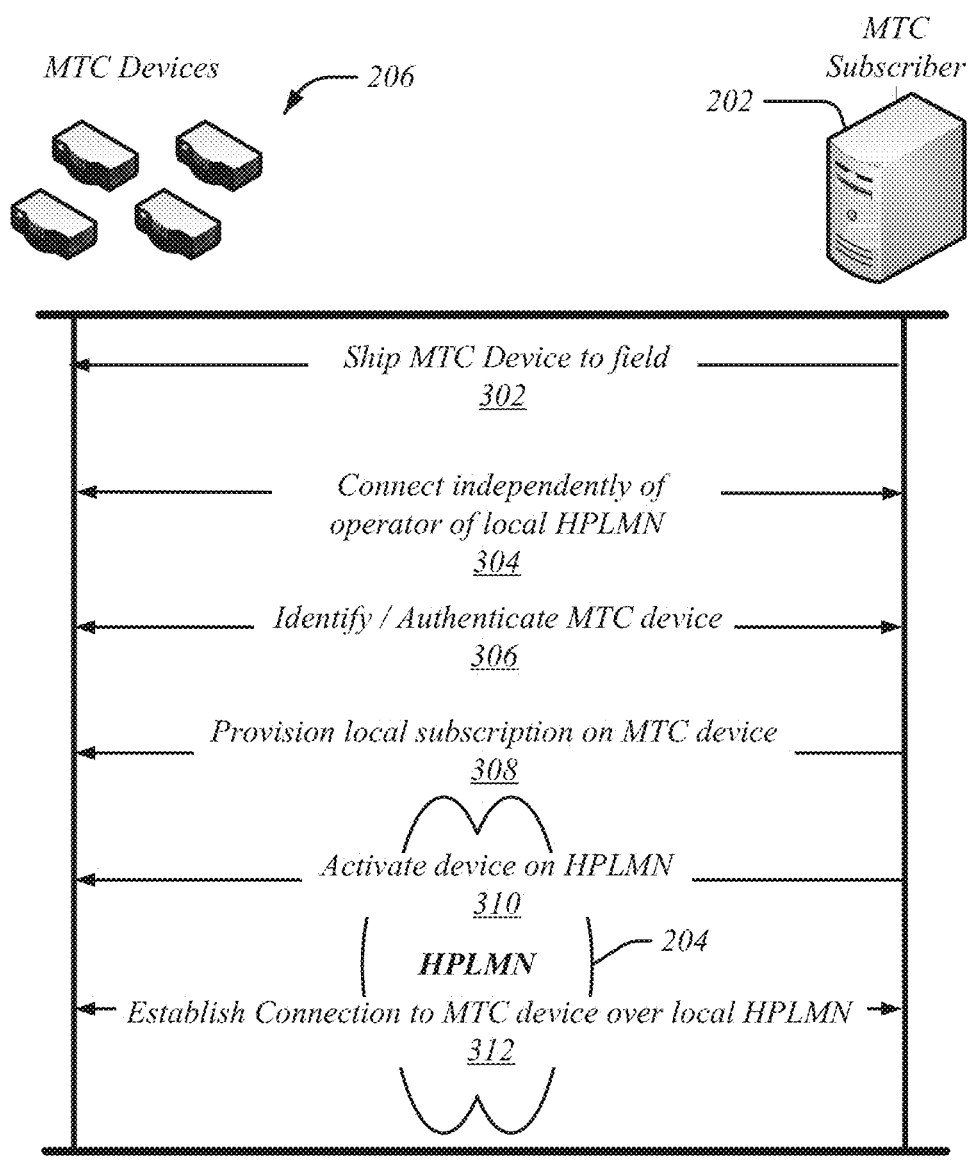
FIG. 3 depicts various operations for deploying an MTC device for operation consistent with the present embodiments.

FIG. 3 depicts various operations for deploying an MTC device for operation consistent with the present embodiments. The operation 302 may involve shipping one or more MTC devices 206 to a location where the MTC devices 206 are to be activated and used. For example, the MTC devices may be shipped from a warehouse location for deployment in a region serviced by HPLMN 204. In the operation 304, a connection between a newly deployed MTC device 206 and the MTC subscriber 202 is established independently of an operator network that operates the HPLMN 204 servicing the region of the MTC device 206. As detailed below, in the present embodiments, an interface may be provided that facilitates communication between an MTC device 206 and MTC subscriber 202 in scenarios in which the MTC device 206 has not yet been authenticated, and in which the location of the MTC device 206 may be a priori unknown to the MTC subscriber. In particular, the interface may facilitate automatic connection of the MTC device 206 and MTC subscriber 202 independent of the operator of the local HPLMN 204. Subsequently, as shown in operation 306, using a connection independent of the operator of the local HPLMN 204, the MTC device 206 may indentify/authenticate to the MTC subscriber 202. During the operation 308, the MTC 202 may then provision the MTC device 206 with a local subscription that allows the MTC device to operate by communicating with the local HPLMN 204. During the operation 310, the MTC subscriber 202 may signal the local HPLMN 204 to activate the MTC device 206, which may trigger the local HPLMN to exchange signals with the MTC device 206. Once the MTC device 206 is activated on the local HPLMN where the MTC device is located, the MTC device 206 may link to its MTC subscriber 202 by means of the local HPLMN 204. Thus, in operation 312, the MTC device 206 and MTC subscriber 202 may connect to one another and the MTC device may operate to send messages to MTC subscriber 202 via the local HPLMN 204.

Once an MTC 204 device is provisioned with a local subscription, the MTC device 204 may operate according to its specified application, such as to provide information to its MTC subscriber 202 on a regular or intermittent basis. Consistent with the present embodiments, as noted above, the subscription arrangements of the present embodiments provide flexibility in managing the life cycles of an individual MTC device 206 and individual subscription, which may in general have independent life cycles. For example, the lifetime of an MTC device 206 may in general be different than the duration of a local subscription that is applied to that MTC device 206. Moreover, the MTC device 206 may be deployed in the different regions in which its local subscription may change. In addition, as noted previously, an individual local subscription may be applied to more than one MTC device 206 in cases where a first MTC device 206 is taken out of commission or fails and is replaced by a second MTC device 206 that assumes the local subscription of the first MTC device.

Figure 4:
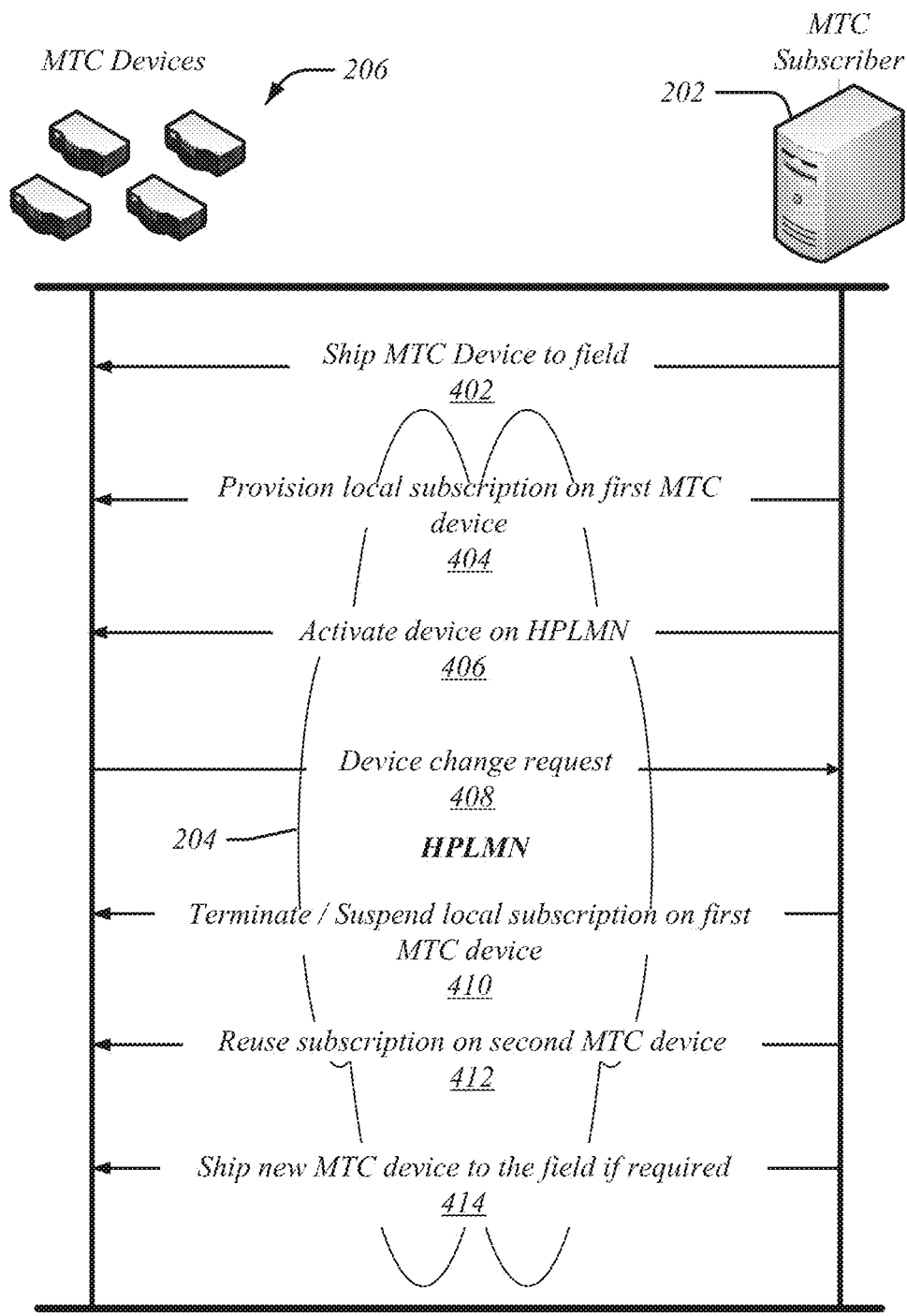
FIG. 4 depicts exemplary operations involved in life cycle management of an MTC device/subscription consistent with various embodiments.

FIG. 4 depicts exemplary operations involved in life cycle management of an MTC device/subscription consistent with various embodiments. The operation 402 denotes shipping of a first MTC device 206 to the field as with operation 302 discussed previously. The operation 402 may denote shipping a new MTC device 206 from a warehouse, but may also apply to cases where a previously used MTC device 206 is being shipped to a new location where it is to be provisioned with a local subscription. After the operation 404 where the first MTC device 206 is provisioned with a local subscription, in operation 406 the first MTC device 206 may be locally activated on the local HPLMN 204 as described above with respect to FIG. 3. Subsequently, during its active life within the local HPLMN 204, the first MTC device 206 may communicate through the local HPLMN 204 with its MTC subscriber 202.

At a future instance, an event may take place that precipitates the decoupling of the first MTC device 206 and its local subscription to the local HPLMN 204. For example, the first MTC device 206 may fail or be taken off-line to be replaced with a new MTC device, or the local subscription may be canceled. The operation 408 of FIG. 4 involves a scenario in which a device change request is sent from the MTC device 206 to the MTC subscriber 202. This request may be precipitated by the failure of the first MTC device, or by another condition that requires the first MTC device to relinquish its current operation with its local subscription. Subsequently, at operation 410, the MTC subscriber 202 may, in response to the operation 408, send a message that terminates or suspends the local subscription on the first MTC device 206.

In additional embodiments, the operation 410 may be performed without the operation 408. In other words, the MTC subscriber 202 may terminate the local subscription on a first MTC device 206 without receiving any change request message. As noted, the MTC user may determine that the first MTC device 206 is to be replaced or its subscription removed for various reasons. At the operation 412, the MTC subscriber 202 sends a message to reprovision the local subscription to a second MTC device 206, which may be deployed in the area of the local HPLMN 204. In some cases, the MTC user may perform an additional operation 414 in which a new MTC device 206 is shipped to the region of the local HPLMN to replace the first MTC device 206 and assume the local subscription. The same or a similar set of procedures as outlined in 302-312 may be applied to the new MTC device 206.

It is to be noted that the above operations outlined in FIGS. 3 and 4 to support MTC device subscription and life cycle management cannot be accomplished with the conventional subscription schemes that have been deployed to support devices such as UEs.

Figure 5:
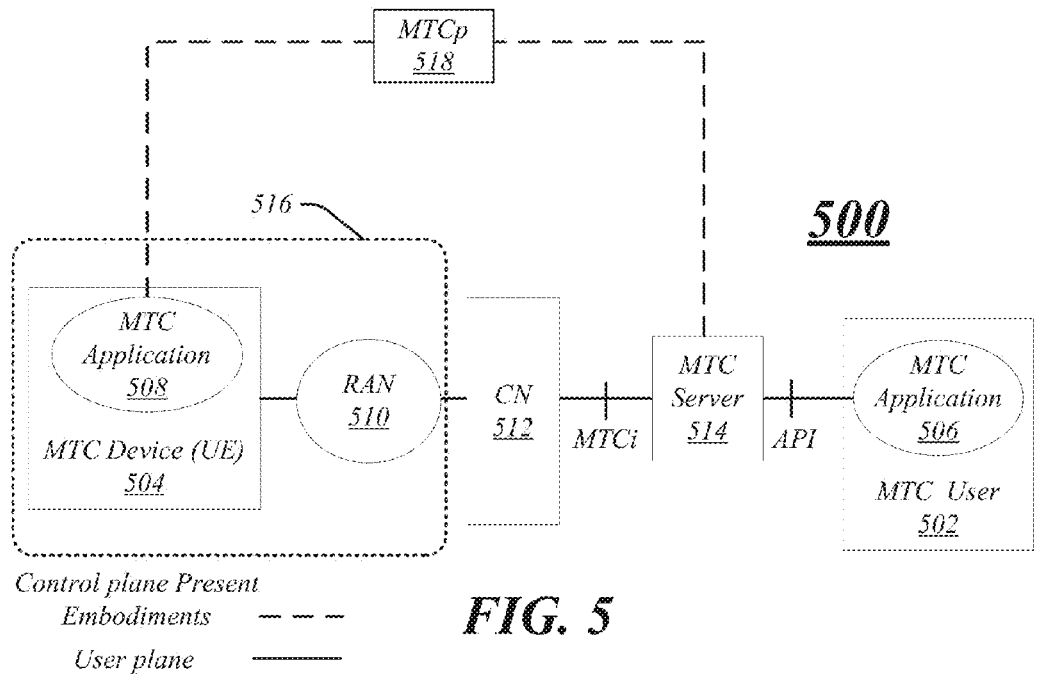
FIG. 5 depicts an architecture that supports subscription provisioning to an MTC device consistent with various embodiments.

FIG. 5 depicts an architecture 500 that supports subscription provisioning to an MTC device consistent with various embodiments. The architecture 500 includes conventional communication links that may be deployed between an MTC user 502 and MTC device 504, which may be deployed in a location remote to the MTC user 502. The MTC user 502, for example, may provision the MTC device 504 to interact with an application 506 resident at the MTC user. For example, one or more MTC applications 508 resident in the MTC device 504 may be employed to send create and/or package information sent to user 502. Under routine operation, the MTC device 504 may couple to the MTC user 502 via the radio access network (RAN) 510, core network 512, and an MTC server 514. In accordance with this architecture, the MTC device 504 may provide signaling including data packets to the MTC user 502. The architecture 500 also provides an arrangement that facilitates deploying the MTC device 504 to a location 516 that is remote to MTC user 502 without having to preprovision a subscription for the MTC device 504 before shipping. In particular, because the MTC device 504 may be remote to the MTC user 502, a device setup interface, herein referred to as the "MTCp" interface 518, may be provided to facilitate operations between the MTC device and MTC user 502 before the MTC device 504 is activated on a local HPLMN. The device setup interface, that is, the MTCp interface 518, may be resident on the MTC device 504 and MTC server 514, for example, and may provide an application programming interface (API) that is exposed by a core network. In this manner, the MTCp interface 518 may allow the MTC device 504 to automatically connect to the MTC subscriber, that is, to the MTC user 502, independently of a local network, such as the local HPLMN. In operation, when an MTC device 504 is deployed for operation, the MTC device may authenticate to the MTC server 514 through a roaming connection, for example. Once authenticated, the MTCp interface 518 may be used to provision to the MTC device 504 a subscription to an HPLMN that is local to the location 516 of the MTC device 504. As illustrated further in FIG. 5, the MTC user 502 may employ the API provided by the MTC server 514 to invoke subscription-related procedures over the MTCp interface 518. The MTC server 514 may provide service capabilities to the MTC user 502. The MTC user 502 may invoke the service capabilities using the API to provision the subscription to the MTC device 504 over the MTCp interface 518. In this manner, the MTCp interface 518 may provide a transport layer between the MTC server 514 and an MTC device 504. In addition, as detailed below, the subscription to different MTC device features may be provided via the MTCp interface 518. Subsequently, when the MTC device 504 is provisioned with a local HPLMN subscription and is set with the desired MTC features, the communications between the MTC server 514 and MTC device 504 may take place via conventional interfaces MTCi and API, as illustrated.

Figure 6:
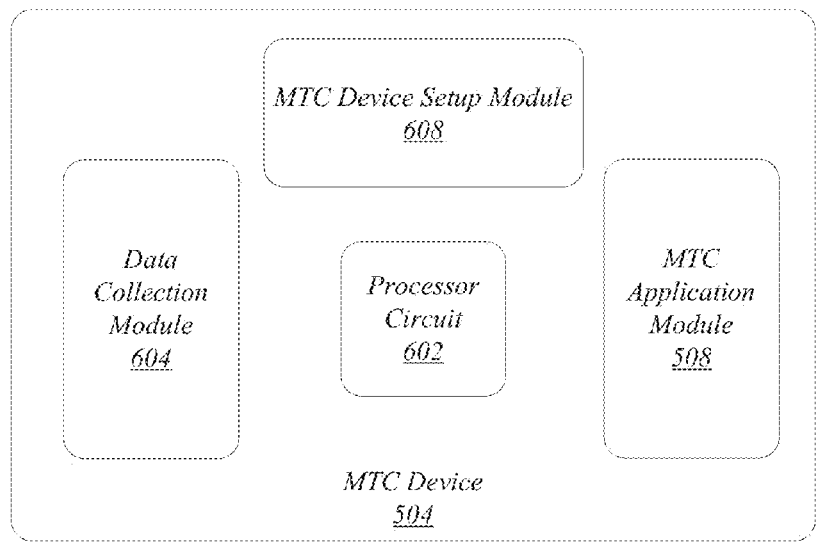
FIG. 6 depicts a block diagram of one arrangement for an MTC device consistent with the present embodiments.

FIG. 6 depicts a block diagram of one arrangement for the MTC device 504 consistent with the present embodiments. In addition to an MTC application module 508, a processor circuit 602 and data collection module 604 are provided, as well as MTC device setup module 608. The data collection module may arrange for data collected by the MTC device 504 to be scheduled for sending to the MTC server 514. In embodiments in which the MTC device 504 is a sensor or meter, such as a utility meter, security sensor, traffic monitor, or other type of monitor, data may be collected on a regular, intermittent, or irregular basis, and may be transmitted to the MTC server 514 on a regular or irregular basis. In some cases, the MTC application module 508 may schedule exchange of information with the MTC user 502 according to a protocol or arrangement established between the MTC user 502 and MTC device 506 for a given application. For example, the MTC device 504 may forward collected data for transmission according to a regular reporting period established by arrangement with the MTC user 502.

Figure 7:
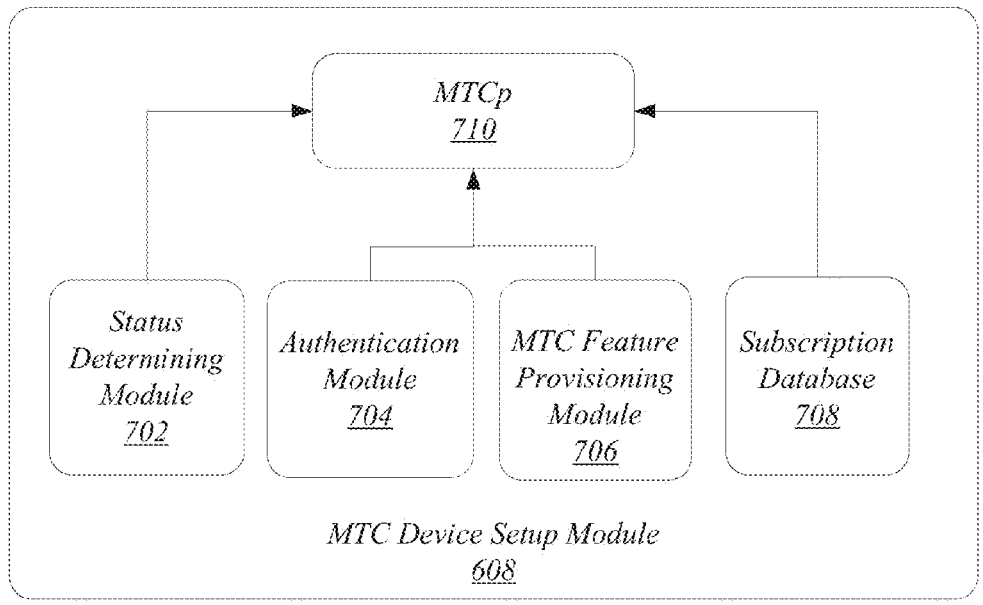
FIG. 7 provides details of an embodiment of an MTC device setup module of FIG. 6.
Figure 8:
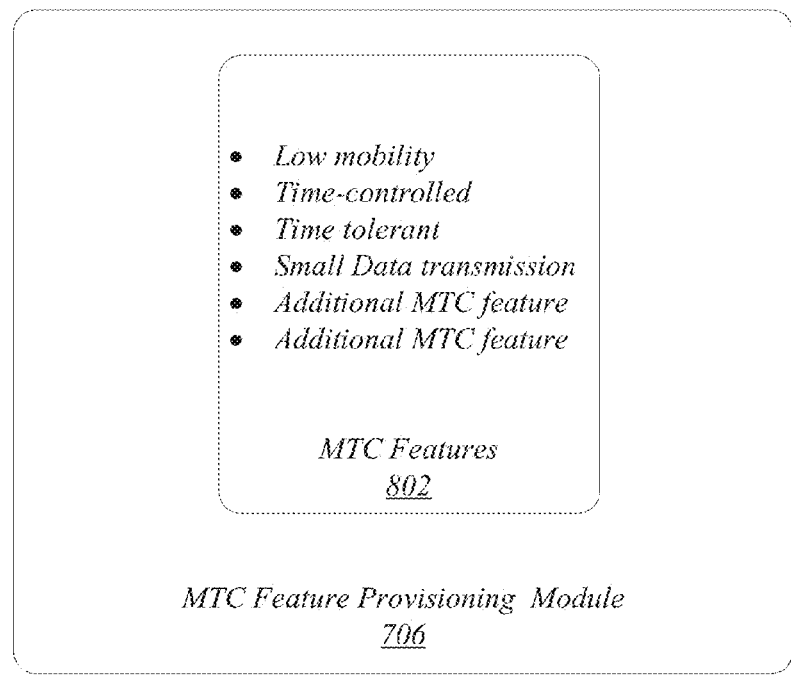
FIG. 8 provides details of one embodiment of a feature provisioning module of FIG. 7.

Details of an embodiment of the MTC device setup module 608 are provided in FIG. 7. As illustrated, MTC device setup module 608 includes a status determining module 702, an authentication module 704, a feature provisioning module 706, a subscription database 708 and MTCp interface 710. The status determining module 702 may act to verify the status of the MTC device 504, such as whether the device 504 is provisioned with a local subscription to a local HPLMN, whether the MTC device 504 requires a given MTC feature, or whether the MTC device is to relinquish a local subscription, for example. The authentication module 704 may act to provide authentication/identification information and procedures for communication between the MTC device 504 and MTC server 514, when a local subscription is to be provided to the MTC device 514. The MTC feature provisioning module 706 may facilitate communicating with the MTC server 514 as to what MTC features are to be provisioned to the MTC device 504, which provisioning may, but need not, take place when the local subscription is provisioned to the MTC device 504. Details of one embodiment of the feature provisioning module are provided in FIG. 8. As depicted therein, various MTC features 802 may be provisioned to the MTC device 504, as set forth in more detail, for example, in 3GPP TS22.368.

The subscription database 708 may include information related to one or more subscriptions that may be provisioned to the MTC device 504, which subscriptions may take place at different intervals of time. Thus, at different points in time, more than one local subscription may be provisioned to the MTC device 504, which may use the information in subscription database 708 in setting up or releasing a local subscription. For example, a first subscription may be active at a first interval of time when the MTC device 504 is deployed in a first location proximate a first HLPMN, while a second subscription may apply when the MTC device 504 is deployed in a second location proximate a second HLPM over a second interval of time. Consistent with various embodiments, the operations performed by one or more of components 702-708 may be performed via the MTCp 710.

Figure 9:
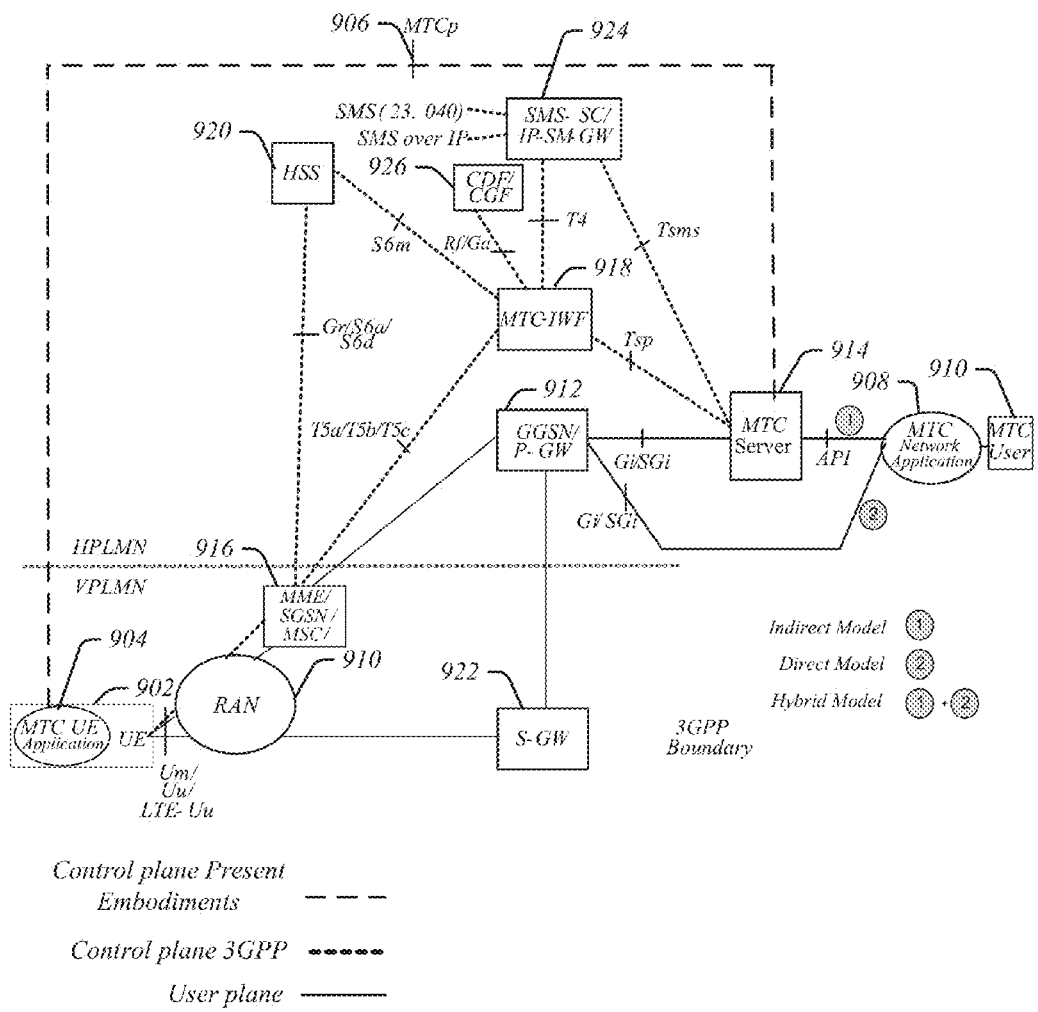
FIG. 9 details an architecture supports subscription provisioning to an MTC device consistent with various additional embodiments FIG. 10 provides an additional architecture that supports subscription provisioning to an MTC device consistent with still further embodiments.

FIG. 9 details an architecture that supports subscription provisioning to an MTC device consistent with various additional embodiments. As illustrated, the architecture 900 provides a modification of the MTC architecture defined in 3GPP TS 23.682 (Technical Specification 23.682, section 4.2, Architectural Reference Model; 3rd Generation Partnership Project; Technical Specification Group Services and System Aspects; Architecture Enhancements to facilitate communications with Packet Data Networks and Applications; (Release 11); November 2011) (hereinafter "TS 23.682"). In the architecture 900, the conventional MTCu interface provides MTC devices access to the 3GPP network for the transport of user and the conventional MTCi interface is the reference point for the MTC server 914 to connect a 3GPP network via 3GPP procedures.

In particular, the dashed lines provide exemplary control plane connections that include new interfaces consistent with the present embodiments. As illustrated, the MTCp interface 906 is defined between the MTC application 904 of UE 902 and the MTC server 914. Additional interfaces (reference points) in the architecture 900 are defined in TS 23.682, as illustrated. However, the reference point names are merely exemplary and the same reference point may be referred to by different names.

The architecture includes a radio access network (RAN) 910 that is coupled to a serving GPRS support node (SGSN)/ mobility management entity (MME) 916 of the core network. MTC interworking function (MTC-IWF) 918, the home subscriber server (HSS) 920, SMS SC/IP-SM-GW function 924, and CDF/CGF function 926 are also included in the core network. In addition, the RAN 910 may be linked to a gateway G-GW 922. Consistent with the present embodiments, the local subscription and various MTC device features as specified in 3GPP TS 22.368 may be provisioned over the MTCp interface 906 without reconfiguring the basic 3GPP MTC architecture.

Figure 10:
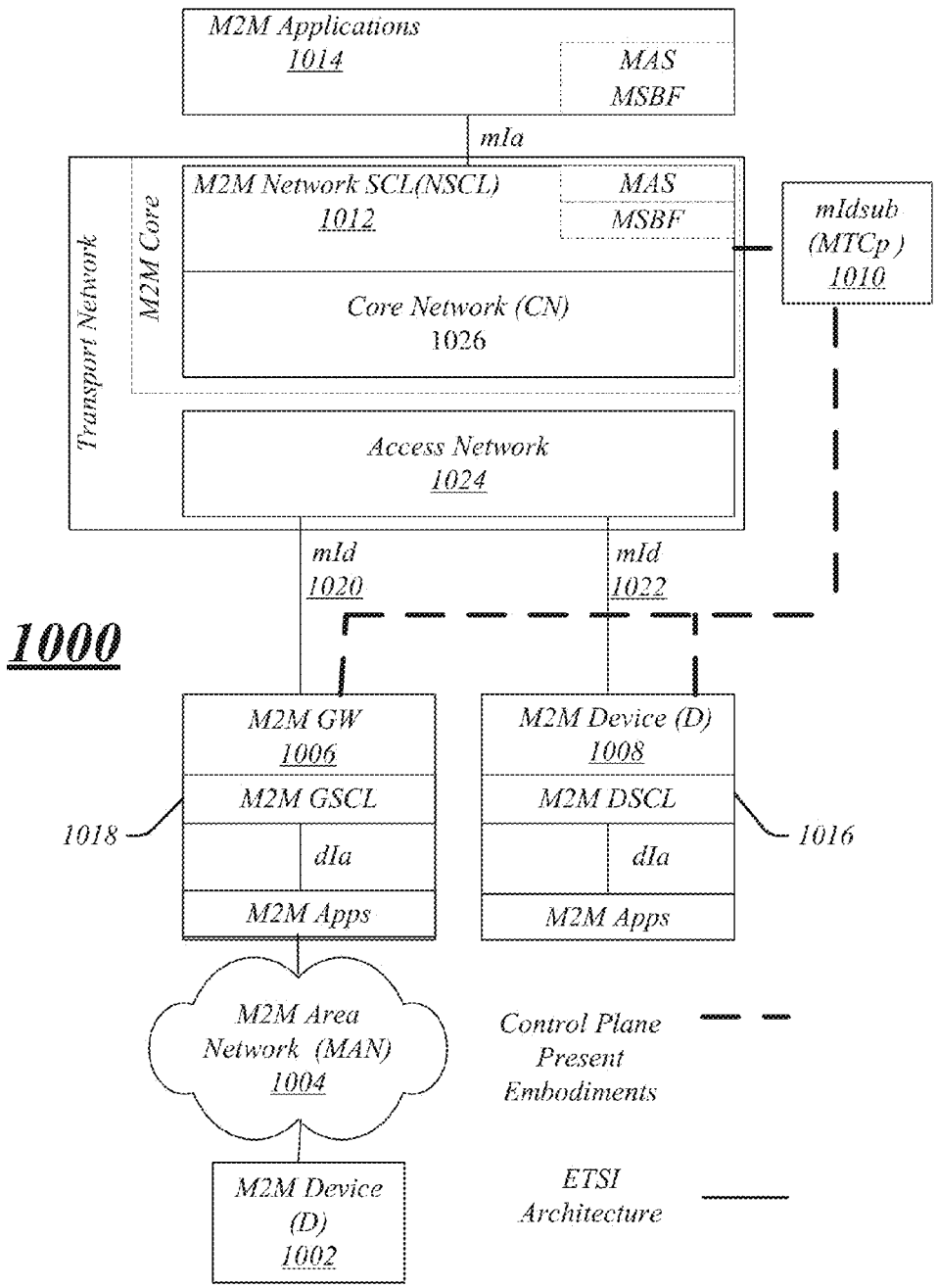

FIG. 10 provides an additional architecture 1000 that supports subscription provisioning to an MTC device consistent with still further embodiments. As illustrated, the architecture 1000 provides a revision to the MTC architecture defined in ETSI TS 102.690 (Machine-to-machine communications (M2M); M2M functional architecture (Stable draft, June 2011). In particular, the dashed lines provide exemplary control plane connections that include new interfaces consistent with the present embodiments. In the example illustrated, the interface that functions as the MTCp interface defined above may be referred to as a "mIdsub" interface to conform to the ETSI M2M nomenclature, which defines "mId" as an interface between network (NW) and device (D) or gateway (GW), and which defines a mIa interface between the NW and an Application Service Provider (ASP).

As detailed in FIG. 10, M2M devices may couple to an M2M application 1014, which may be located at a remote subscriber location, via the mIdsub interface 1010. For example, the M2M device 1002 is coupled to the mIdsub interface 1010 via an M2M area network 1004 and M2M gateway (GW) 1006, while the M2M device 1008 is connected directly to the mIdsub interface 1010, which may be included within the M2M device 1008. In particular, the mIdsub interface 1010 provides an interface between the Network Service Capability Layer (NSCL) 1012 and the D/GW 1008/1006. Consistent with various embodiments, the mIDsub interface 1010 may act in a similar fashion as the MTCp interface 906 of the 3GPP-based architecture depicted in FIG. 9 to provision the M2M devices 1008 (1002) with subscriptions to services and applications registered with the D/GW Service Capability Layer (M2M DSCL 1016/M2MGSCL 1018).

Subsequently, after being provisioned with a local subscription, the M2M device 1002/1008 may communicate via respective conventional interfaces mId 1020/1022 with the (remote) M2M applications 1014, via a (local) access network 1024 and core network 1026 of the operator to which the local subscription is provisioned.

In various embodiments, the aforementioned 3GPP-based MTCp interface and the ETSI-based mIDsub interface may be implemented over existing device management protocols, such as OMA-DM (open mobile alliance device management) specified by the Open Mobile Alliance, or the Wireless M2M Protocol-Transport (WMMPT) specified by the China communications standard association (CCSA).

In additional embodiments, a subscription management interface may be deployed in a wired communications network. For example, such an interface may be deployed to support customer premises equipment wide area network (CPEWAN) Management Protocol (CWMP) specified by the TR-069 defined by the broadband forum (BBF).

In summary, the present embodiments provide management of MTC/M2M devices that is not achievable through conventional schemes. For one, MTC devices 206 may be shipped without any network subscription into the "field" where the MTC device 206 is to be operated. This avoids the need for a single home operator to establish multiple roaming agreements with multiple network partners at the various locations where MTC devices 206 are to be deployed. In addition, the MTC device 206 and subscription to a local network may be managed separately, such that a local subscription can be ported between different MTC devices 206, an MTC device 206 may assume different local subscriptions over its lifetime, and therefore may potentially have multiple subscriptions to be activated according to the appropriate location and operational state of the MTC device 206.

Included herein is a set of flow charts representative of exemplary methodologies for performing novel aspects of the disclosed system and architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 11:
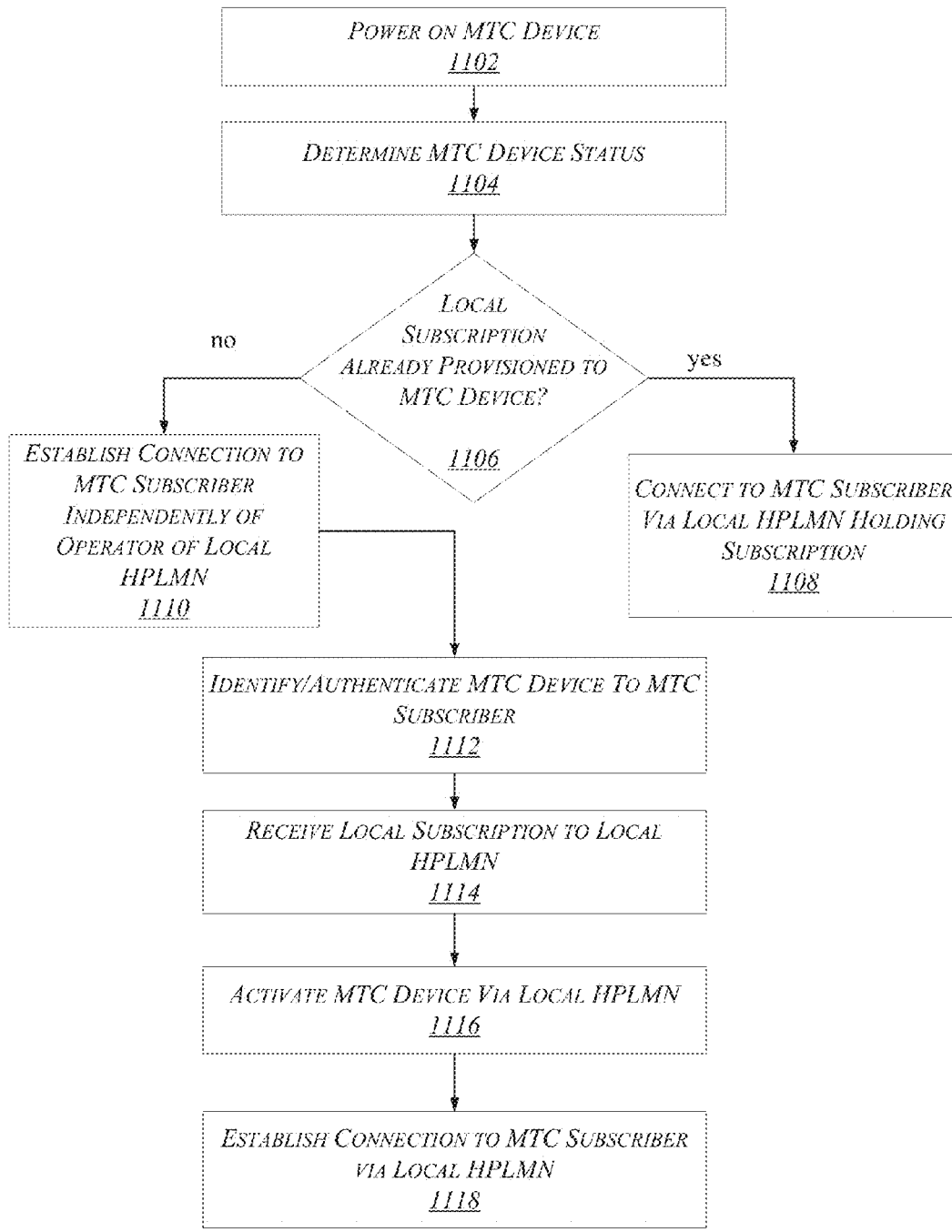
FIG. 11 depicts an exemplary logic flow.

FIG. 11 depicts an exemplary logic flow 900. At block 1102, an MTC device 206 is powered on. At block 1104, the MTC device status is checked. At block 1106, a determination is made as to whether a local subscription is already provisioned to the MTC device 206. The local subscription may be a subscription to an HPLMN located within a local range of the MTC device 206.

If, at block 1106, a local subscription is determined to exist, the flow moves to block 1108, where the MTC device 206 connects to the MTC subscriber via the local HPLMN that provides the local subscription. If, at block 1106, the local subscription has not been provisioned to the MTC device 206, the flow moves to block 1110.

At block 1110 a connection is established from the MTC device 206 to the MTC subscriber independently of the operator of the local HPLMN.

At block 1112, the MTC device 206 is identified/authenticated to the MTC subscriber. At block 1114, a local subscription for the local HPLMN is received/provisioned to the MTC device 206. Continuing to block 1116, the MTC device 206 is activated for operation on the local HPLMN. At block 1118, the MTC device 206 establishes a connection to the MTC subscriber via the local HPLMN.

Figure 12:
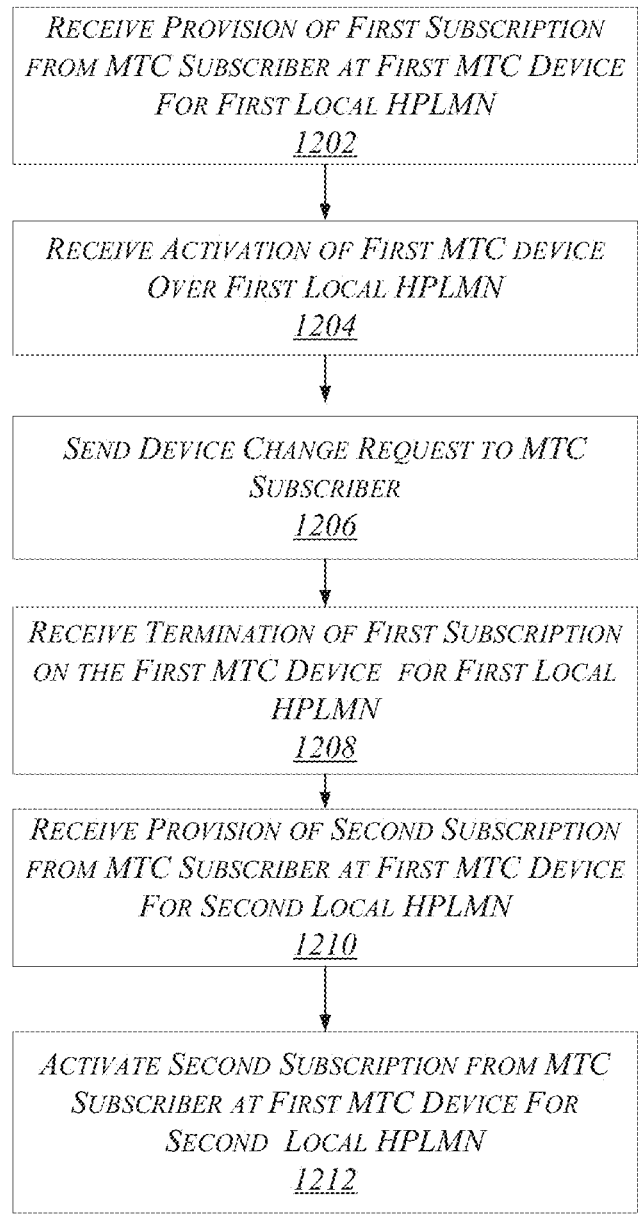
FIG. 12 depicts a logic flow consistent with additional embodiments.

FIG. 12 depicts another exemplary logic flow consistent with further embodiments. At block 1202, a provision of a first subscription is received from an MTC subscriber at a first MTC device for a first local HPLMN. At block 1204, an activation of the first MTC device is received for operation over the first local HPLMN. At block 1206, a device change request is sent to the MTC subscriber. At block 1208 a termination is received of the first subscription on the first MTC device for the first local HPLMN. At block 1210 a provision of a second subscription is received from the MTC subscriber at the first MTC device for a second local HPLMN that may be located at a different geographical region than the first local HPLMN. At block 1212, the second subscription from the MTC subscriber is activated at the first MTC device for the second local HPLMN.

Figure 13:
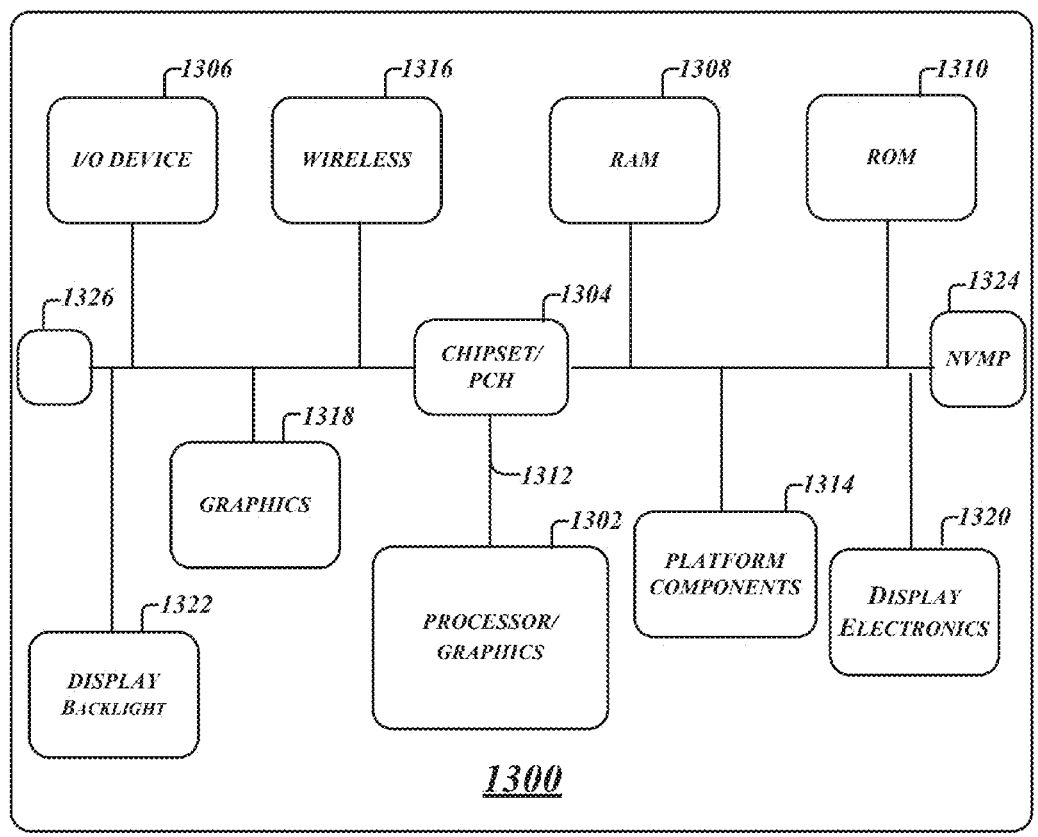
FIG. 13 is a diagram of an exemplary system embodiment.

FIG. 13 is a diagram of an exemplary system embodiment and in particular, FIG. 13 is a diagram showing a platform 1300, which may include various elements. For instance, FIG. 13 shows that platform (system) 1310 may include a processor/graphics core 1302, a chipset/platform control hub (PCH) 1304, an input/output (I/O) device 1306, a random access memory (RAM) (such as dynamic RAM (DRAM)) 1308, and a read only memory (ROM) 1310, display electronics 1320, display backlight 1322, and various other platform components 1314 (e.g., a fan, a crossflow blower, a heat sink, DTM system, cooling system, housing, vents, and so forth). System 1300 may also include wireless communications chip 1316 and graphics device 1318. The embodiments, however, are not limited to these elements.

As shown in FIG. 13, I/O device 1306, RAM 1308, and ROM 1310 are coupled to processor 1302 by way of chipset 1304. Chipset 1304 may be coupled to processor 1302 by a bus 1312. Accordingly, bus 1312 may include multiple lines.

Processor 1302 may be a central processing unit comprising one or more processor cores and may include any number of processors having any number of processor cores. The processor 1302 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1302 may be multiple separate processors located on separate integrated circuit chips. In some embodiments processor 1302 may be a processor having integrated graphics, while in other embodiments processor 1302 may be a graphics core or cores.

Figure 14:
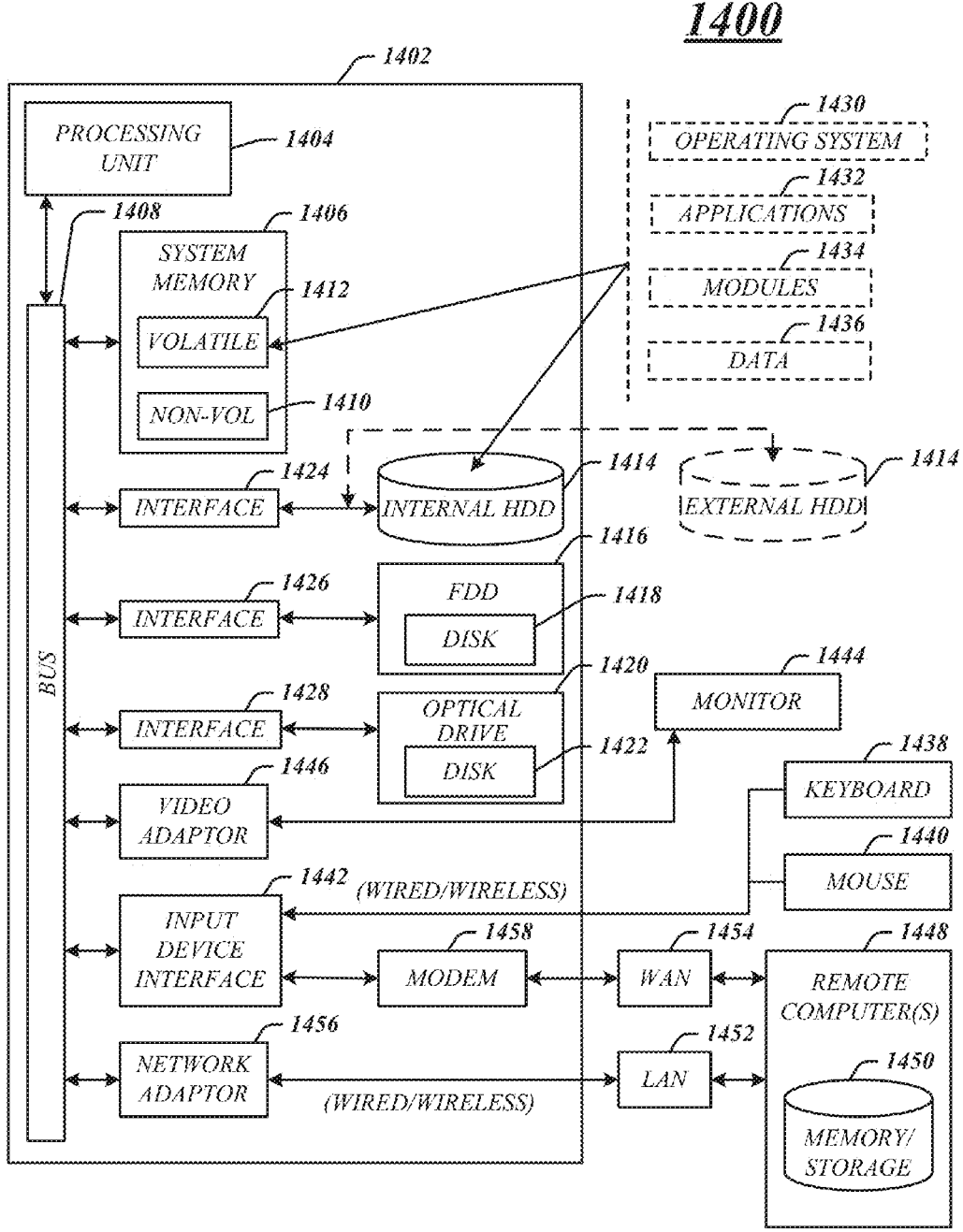
FIG. 14 illustrates an embodiment of an exemplary computing architecture.

FIG. 14 illustrates an embodiment of an exemplary computing system (architecture) 1400 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1400 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1400 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1400.

As shown in FIG. 14, the computing architecture 1400 comprises a processing unit 1404, a system memory 1406 and a system bus 1408. The processing unit 1404 can be any of various commercially available processors. Dual microprocessors and other multi processor architectures may also be employed as the processing unit 1404. The system bus 1408 provides an interface for system components including, but not limited to, the system memory 1406 to the processing unit 1404. The system bus 1408 can be any of several types of bus structure that may further interconnect to a memory bus (with or without a memory controller), a peripheral bus, and a local bus using any of a variety of commercially available bus architectures.

The computing architecture 1400 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 14, the system memory 1406 can include non-volatile memory 1410 and/or volatile memory 1412. A basic input/output system (BIOS) can be stored in the non-volatile memory 1410.

The computer 1402 may include various types of computer-readable storage media in the form of one or more lower speed memory units, including an internal hard disk drive (HDD) 1414, a magnetic floppy disk drive (FDD) 1416 to read from or write to a removable magnetic disk 1418, and an optical disk drive 1420 to read from or write to a removable optical disk 1422 (e.g., a CD-ROM or DVD). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1294 interface technologies.

The drives and associated computer-readable media provide volatile and/or nonvolatile storage of data, data structures, computer-executable instructions, and so forth. For example, a number of program modules can be stored in the drives and memory units 1410, 1412, including an operating system 1430, one or more application programs 1432, other program modules 1434, and program data 1436.

A user can enter commands and information into the computer 1202 through one or more wire/wireless input devices, for example, a keyboard 1438 and a pointing device, such as a mouse 1440. Other input devices may include a microphone, an infra-red (IR) remote control, a joystick, a game pad, a stylus pen, touch screen, or the like. These and other input devices are often connected to the processing unit 1404 through an input device interface 1442 that is coupled to the system bus 1408, but can be connected by other interfaces such as a parallel port, IEEE 1294 serial port, a game port, a USB port, an IR interface, and so forth.

A monitor 1444 or other type of display device is also connected to the system bus 1408 via an interface, such as a video adaptor 1446. In addition to the monitor 1444, a computer typically includes other peripheral output devices, such as speakers, printers, and so forth.

The computer 1402 may operate in a networked environment using logical connections via wire and/or wireless communications to one or more remote computers, such as a remote computer 1448. The remote computer 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, connects to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Embodiments may also be at least partly implemented as instructions contained in or on a non-transitory computer-readable medium, which may be read and executed by one or more processors to enable performance of the operations described herein."

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a processor circuit; and
   a machine-type communications (MTC) device setup module operative on the processor circuit to determine when a device is without a subscription to a local home public land mobile network (HPLMN) comprising an HPLMN that is local to the device but not local to an MTC subscriber of the device, the MTC device setup module operative on the processor circuit to provide a device setup interface to automatically connect the device to the MTC subscriber through the local HPLMN without a subscription, and receive a subscription to the local HPLMN from the MTC subscriber.

2. The apparatus of claim 1, the MTC device setup module operative to schedule identification of the device to be sent to the MTC subscriber via the device setup interface.

3. The apparatus of claim 1, the MTC device setup module operative on the processor to schedule authentication for the device to be sent to the MTC subscriber via the device setup interface.

4. The apparatus of claim 1, the MTC device setup interface operative to receive a message to terminate the subscription from the MTC subscriber.

5. The apparatus of claim 1, the MTC device setup module operative to receive a multiplicity of subscriptions, one or more of the multiplicity of subscriptions to subscribe the device to a respective HPLMN that is outside of a local HPLMN of the MTC subscriber.

6. The apparatus of claim 1, the MTC device setup module operative to schedule MTC features for the device to be activated via the device setup interface.

7. The apparatus of claim 1, comprising a subscription database to provide a record of subscriptions operable for the device on one or more HPLMNs.

8. The apparatus of claim 1, comprising:
   a data collection module operative to collect data for transmission to the MTC subscriber; and
   an MTC application module operative to schedule the collected data for transmission according to an arrangement with the MTC subscriber.

9. The apparatus of claim 1, comprising a sensor to detect data to be transmitted to the MTC subscriber once connected.

10. The apparatus of claim 1, the MTC device setup module operative to schedule one or more of identification and authentication of the device to be sent to the MTC subscriber via the device setup interface.

11. The apparatus of claim 1, comprising an MTC application module to schedule the collected data for transmission according to an arrangement with the MTC subscriber.

12. A method, comprising:
    determining that a device is not provisioned with a subscription to a local home public land mobile network (HPLMN) comprising an HPLMN that is local to the device but not local to a machine-type communications (MTC) subscriber of the device;
    connecting the device to the MTC subscriber through the local HPLMN via a device setup interface;
    receiving a subscription to the local HPLMN from the MTC subscriber via the device setup interface; and
    subscribing the device to the local HPLMN with the received subscription.

13. The method of claim 12, comprising scheduling one or more of identification or authentication of the device to be sent via the device setup interface to the MTC subscriber.

14. The method of claim 12 comprising receiving instructions to terminate the subscription from the MTC subscriber.

15. The method of claim 12, comprising scheduling MTC features for the device to be activated via the device setup interface.

16. The method of claim 12, comprising:
    terminating the subscription from the MTC subscriber; and
    receiving a second subscription to a second HPLMN via the device setup interface.

17. At least one non-transitory computer-readable storage medium comprising a plurality of instructions that, when executed, cause a system to:
    determine when a device is without a subscription to a local home public land mobile network (HPLMN) comprising an HPLMN that is local to the device but not local to a machine-type communications (MTC) subscriber of the device;
    provide a device setup interface to automatically connect the device to the MTC subscriber through the local HPLMN without a subscription; and
    receive a subscription to the local HPLMN from the MTC subscriber.

18. The at least one non-transitory computer-readable storage medium of claim 17 comprising instructions that, when executed, cause a system to schedule identification of the device to be sent to the MTC subscriber via the device setup interface.

19. The at least one non-transitory computer-readable storage medium of claim 17 comprising instructions that, when executed, cause a system to schedule authentication for the device to be sent to the MTC subscriber via the device setup interface.

20. The at least one non-transitory computer-readable storage medium of claim 18 comprising instructions that, when executed, cause a system to receive a message to terminate the subscription from the MTC subscriber.

21. The at least one non-transitory computer-readable storage medium of claim 17 comprising instructions that, when executed, cause a system to receive a multiplicity of subscriptions, one or more of the multiplicity of subscriptions to subscribe the device to a respective HPLMN that is outside of a local HPLMN of the MTC subscriber.

22. The at least one non-transitory computer-readable storage medium of claim 17 comprising instructions that, when executed, cause a system to schedule MTC features for the device to be activated via the device setup interface.

23. The at least one non-transitory computer-readable storage medium of claim 17 comprising instructions that, when executed, cause a system to provide a record of subscriptions operable for the device on one or more HPLMNs.

24. The at least one non-transitory computer-readable storage medium of claim 17 comprising instructions that, when executed, cause a system to schedule one or more of identification and authentication of the device to be sent to the MTC subscriber via the device setup interface.

25. The at least one non-transitory computer-readable storage medium of claim 17 comprising instructions that, when executed, cause a system to schedule the collected data for transmission according to an arrangement with the MTC subscriber.

* * * * *